United States Patent
Itzhak

(10) Patent No.: US 7,822,549 B2
(45) Date of Patent: Oct. 26, 2010

(54) GLOBAL POSITIONING USING PLANETARY CONSTANTS

(76) Inventor: Sapir Itzhak, 27 Foxhill, Irvine, CA (US) 92604

( * ) Notice: Subject to any disclaimer, the term of this patent is extended or adjusted under 35 U.S.C. 154(b) by 1209 days.

(21) Appl. No.: 11/429,468

(22) Filed: May 5, 2006

(65) Prior Publication Data

US 2010/0211351 A1    Aug. 19, 2010

Related U.S. Application Data

(60) Provisional application No. 60/678,618, filed on May 5, 2005.

(51) Int. Cl.
*G01C 21/00* (2006.01)
(52) U.S. Cl. .................. 701/213; 701/214; 701/216
(58) Field of Classification Search .......... 701/213, 701/214, 216, 219, 221, 225; 359/429, 430
See application file for complete search history.

(56) References Cited

U.S. PATENT DOCUMENTS

| | | | | |
|---|---|---|---|---|
| 6,392,799 B1* | 5/2002 | Baun et al. | ................ | 359/430 |
| 2002/0140745 A1* | 10/2002 | Ellenby et al. | ............ | 345/848 |
| 2003/0114984 A1* | 6/2003 | Scherzinger | ................ | 701/216 |

\* cited by examiner

*Primary Examiner*—Gertrude Arthur Jeanglaud

(57) ABSTRACT

The disclosed invention is generally comprised of a device capable of measuring the vector sum of the centripetal acceleration of the rotation of the Earth (or that of any other planet in a planetary system) around its axis ($a_{rot}$) and the centripetal acceleration of the planet's revolution in its orbit around the Sun ($a_{rev}$) and a method for performing the same using the measured physical data to calculate the latitude and longitude of the device on a surface. Measurements are taken by stepping accelerometers through different axis to determine centripetal acceleration, reading the output of the accelerometers and reading the angular disposition of the accelerometers using encoders and calculating the latitude and longitude from the measured data.

25 Claims, 2 Drawing Sheets

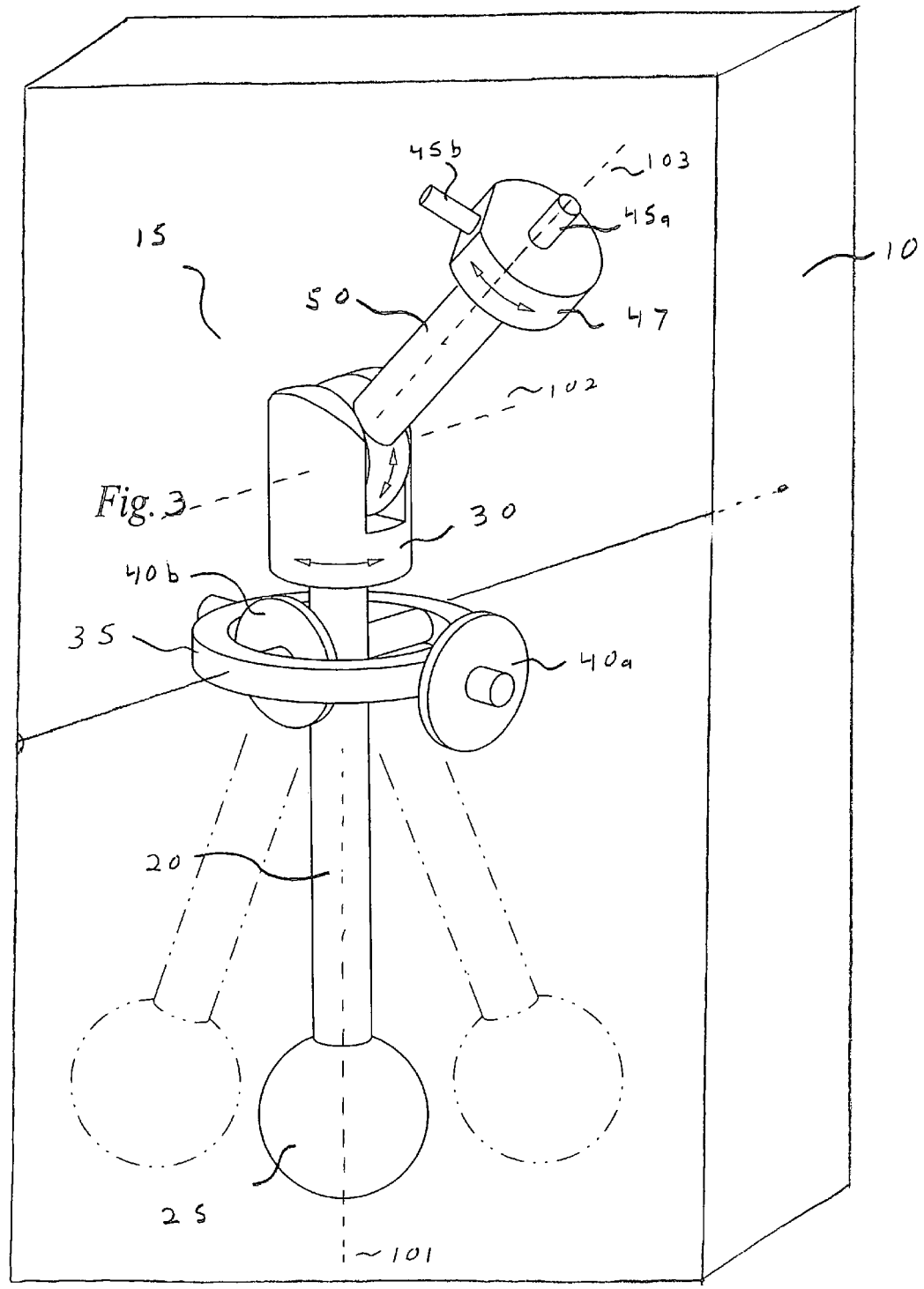

GLOBAL POSITIONING USING PLANETARY CONSTANTS

CROSS-REFERENCE TO RELATED APPLICATIONS

This application claims the benefit of U.S. Provisional Patent Application 60/678,618 filed on May 5, 2005, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention generally relates to the field of global positioning systems (GPS) and methods. Specifically, the invention relates to a method and system for the determination of the latitude, longitude and orientation of an object by measuring the vector sum of the centripetal acceleration of the rotation of the earth (or that of a planet in a planetary system) around its axis ($a_{rot}$) and the centripetal acceleration of the planet's revolution in its orbit around the sun ($a_{rev}$) by the use of multiple accelerometers rotated around different axis.

2. Description of the Background Art

The present global positioning system (GPS) comprises a satellite signaling system of more than two dozen satellites that allows a user to determine the longitude, latitude and altitude of a GPS receiver on the Earth. GPS receivers and related devices are becoming commonplace and can be found in many commercial, consumer and military applications.

In very general terms, a GPS receiver receives precisely timed and synchronized UHF signals from the GPS satellite system and decodes them in order to determine the GPS receiver's position on Earth. The present GPS system is very effective for applications where UHF reception is available and dependable. On the other hand, locations and conditions exist where GPS signals cannot be received such as underground (as in a tunnel or mine), in a shielded location or in situations where GPS satellite signals have been jammed. Furthermore, situations can arise where one or more of the GPS satellites in a system are not functioning property or have been disabled.

What is needed is a device and method that will allow a user to determine reasonably precise latitude and longitude data at locations where GPS satellite signals are unavailable.

SUMMARY OF THE INVENTION

The disclosed invention provides for the determination of the latitude, longitude and orientation of an object on a planet without the use of GPS satellites, magnetic compass or traditional navigation methods such as stellar navigation.

The disclosed invention is generally comprised of a device capable of measuring the vector sum of the centripetal acceleration of the rotation of the earth (or that of any other planet in a planetary system) around its axis ($a_{rot}$) and the centripetal acceleration of the planet's revolution in its orbit around the sun ($a_{rev}$) and a method for performing the same.

The invention comprises one or more inertial measurement devices such as accelerometers, an algorithm and software for interpreting the centripetal acceleration measurements and for computing the device's latitude, longitude and orientation.

The invention is based on the fact that the two vector quantities above exhibit known, predicable behavior. The vector $a_{rot}$ always points towards the axis of rotation of the planet, is perpendicular to it and has a magnitude proportional to the latitude due to different rotation radii at different latitudes. The vector $a_{rev}$ is a universal vector that can be pre-calculated for every point of a planet's orbit around the sun (therefore, for every point in time), and can be stored in a lookup table.

The measurement and look up hardware is simple and easy to fabricate and the calculation algorithms can run on a low cost, low-power processor and produce the required results.

The invention and its various embodiments can now be better understood by turning to the following detailed description of the preferred embodiments which are presented as examples of the invention defined in the claims. It is expressly understood that the invention as defined by the claims may be broader than the embodiments described below.

BRIEF DESCRIPTION OF THE DRAWINGS

FIG. 3 reflects the measurement assembly of the invention.

DETAILED DESCRIPTION OF THE INVENTION

Figure 1:
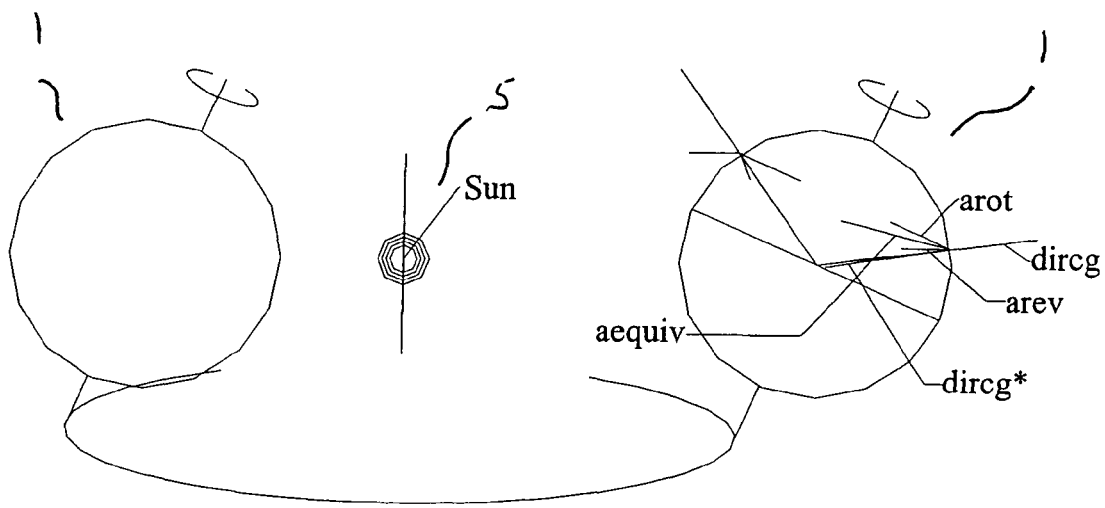
FIG. 1. shows a planet, such as Earth, in rotation around its axis and in orbit around a sun.
Figure 2:
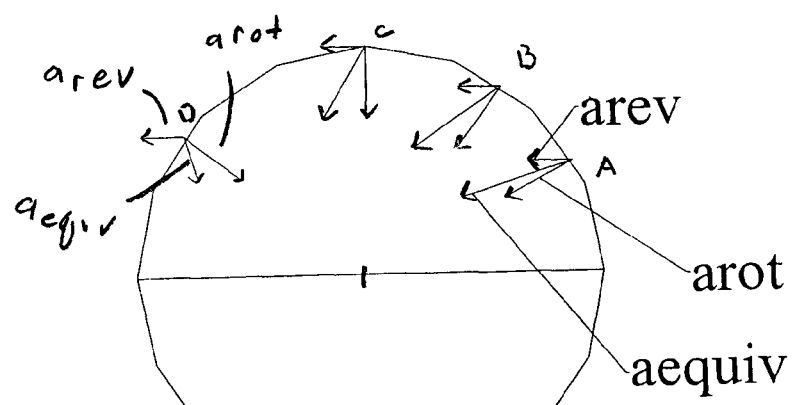
FIG. 2 illustrates a view perpendicular to the planet's axis of rotation and the relative changes in vectors $a_{rev}$, $a_{rot}$ and $a_{equiv}$ along a latitude at points A, B, C and D.

Turning now to the figures wherein like numerals denote like elements among the several views, FIG. 1 illustrates a planetary system showing a planet 1, such as the Earth, in rotation around a sun 5 along with the centripetal acceleration vectors to be measured and determined as discussed below. FIG. 1 and FIG. 2 also show the direction and magnitude of the measured vectors $a_{rev}$ and $a_{rot}$, the measured vector direction of the planet's center of gravity $dir_{cg}$ and the calculated vector sum $a_{equiv}$.

The invention takes advantage of the fact that the two measured centripetal acceleration vectors exhibit known behaviors. The vector $a_{rot}$ will always points towards the axis of rotation of the planet, is perpendicular to it and has a magnitude proportional to the latitude due to different rotation radii at different latitudes.

The vector $a_{rev}$ is a universal centripetal acceleration vector that can be pre-calculated for every point of a planet's orbit around the sun (therefore, for every point in time), and can be stored in a lookup table, such as a flash memory lookup table. It is assumed that $a_{rev}$'s change due to the invention's location on the planet is negligible, though in cases where improved accuracy is preferred, this assumption can be made for the first location computation iteration and the resulting location used in determining a modified $a_{rev}$. Further iterations may be performed for enhanced accuracy of the system.

By the nature of the physical system, the vector sum of $a_{rot}$ and $a_{rev}$, referred to herein as ($a_{equiv}$) has, at any given location, a maximum magnitude when the longitude of the invention's location is directly away from and opposing the sun (more accurately, when the longitude points toward the negative direction of $a_{rev}$). Conversely, the minimum magnitude of $a_{equiv}$ occurs when the longitude of the invention's location points toward and is nearest the sun (when the longitude points toward the positive direction of $a_{rev}$).

The vectors $a_{rot}$ and $a_{rev}$ can be used for determining the position of the invention on a planet in at least two variations, referred to herein as the direct computation method and the indirect computation method.

The direct computation method is faster but its accuracy depends upon the accuracy, precision and calibration of the inertial measurement sensors (i.e., accelerometers) in the system. The indirect method is relatively slower and requires the invention to remain stationary for at least a day or one planetary rotation period. The indirect method does not rely on the accuracy and calibration of the measurement sensors and the invention's accuracy improves over time.

The computation algorithm for either method can be performed on board the invention using on-board circuitry or by remote computer using the raw measurement data output from the invention. Alternately, both computation methods may be used sequentially to provide the benefit of immediate position determination and improved accuracy over time for applications where the invention remains stationary.

Measurement accuracy is generally higher in cases where the measured values of $a_{rev}$ and $a_{rot}$ are in the same order of magnitude. In such cases, the relative change in each vectors' direction results a correspondingly larger change in the vector magnitude of $a_{equiv}$. This has the beneficial result of providing higher resolution of the measurement of $a_{equiv}$ and optimizes the time it takes to reach maximum and minimum values for an accelerometer with a given accuracy and precision.

By way of example and not by limitation, Earth's $a_{rev}$ is approximately 0.006 m/sec$^2$ and its $a_{rot}$ is approximately 0.033 m/sec$^2$ to 0.006 m/sec$^2$ between latitude 0 and 80 (0.0006 m/sec$^2$ in latitude 89). Accordingly, for major portions of the surface area of the Earth, the vectors are within the same order of magnitude.

Turning now to FIG. 3, a preferred embodiment of the present invention comprises a housing 10 and a centripetal acceleration measurement assembly 15. The measuring device is preferably in the form of a cube or equivalent in order to provide a flat, stable surface for the device to rest on when deployed in a random manner, such as being dropped from a plane or thrown by a soldier.

The vector used as a reference for the centripetal acceleration measurements is the vector pointing towards the planet's center of gravity, referred to herein as $dir_{cg}$.

Measurement assembly 15 is comprised of reference member 20 having a weighted end 25 and a rotating end 30. Reference member 20 is pivotably or swingably mounted to a frame 35 such that weighted end 25 has a freedom of travel limitation such that it may only swing or pivot in an X and a Y direction much like a pendulum but in orthogonal planes. Reference member 20 is mounted to frame 35 so that weighted end 25 causes reference member 20 to function similar to a plumb line limited to swinging only at orthogonal angles. For this purpose, weighted end 25 is capable of pivoting around a point such that it remains directed toward the center of gravity of the planet. This pivoting orientation permits rotation around the two axes orthogonal to $dir_{cg}$. Rotation of the weighted end 25 around $dir_{cg}$ is locked after $dir_{cg}$ is determined.

The two angles created by the angular displacement of reference member 20 are read using angular measurement means such as encoders 40a and 40b with reference to housing 10. The readout angles ($A_{cg}1$ and $A_{cg}2$) are used to determine the orientation of housing 10 at a later stage. Encoders 40a and 40b, such as optical absolute encoders, are mounted within housing 10 whereby the angles of reference member 20 with respect to its X and Y (i.e., two dimensional/orthogonal) displacement relative to a planet's $dir_{cg}$ may be determined and read out into memory for later calculation.

The angles indicated by reference member 20 may be slightly shifted from the theoretical $dir_{cg}$ due to error-factors such as the centrifugal force acting on weighted end 25 as a result of $a_{equiv}$. Although this factor may be two to three orders of magnitude smaller than gravity, it can have a significant overall effect on $dir_{cg}$. Other error factors may be local gravity-altering conditions such mountains, tides and local mass concentrations. This shifted direction is referred to as the measured $dir_{cg}$ ($dir_{cg}$*). A scheme for determining the absolute $dir_{cg}$ is described below. In any case, $dir_{cg}$ is used for determining the orientation of housing 10 and is not used for position determination.

The preferred embodiment of the invention incorporates two inertial measurement devices, such as accelerometers, indicated as first accelerometer 45a and second accelerometer 45b. First and second accelerometers may be piezoelectric, piezoresistive, MEMS or equivalent accelerometer or inertial measurement devices. As is seen, rotating head 47 is rotatably mounted to arm 50 whereby it is rotatable about the axis of arm 50.

First accelerometer 45a is mounted to rotating head 47 whereby the acceleration with respect to the axis of the arm 50 may be measured. Second accelerometer 45b is mounted to rotating head 47 whereby acceleration perpendicular to the axis of arm 50 may be measured.

First and second accelerometers 45a and 45b are mounted perpendicular to one another with a preferred measurement range of 0.04 m/sec$^2$ to 0.004 m/sec$^2$. This is the approximate total range expected for $a_{equiv}$ on Earth. Different ranges may be used on different planets.

Accelerometers 45a and 45b are mounted on arm 50 which is capable of rotating in three orthogonal (i.e., X, Y and Z) axes. The first axis 101 is around $dir_{cg}$, or around $dir_{cg}$* with correction calculation as described below. The second axis 102 is around the axis perpendicular to both $dir_{cg}$* and arm 50. The third axis 103 is around the axis of arm 50 itself.

Accelerometers 45a and 45b are mounted whereby one of them takes measurements in the direction of the arm (45a) and the other one, in a direction perpendicular to it (45b). Accelerometers 45a and 45b are each mounted on rotating head 47 as seen in FIG. 3.

Each freedom of rotation of the device at the rotating end, arm and rotating head has a means, such as an encoder (not shown), for reading the rotation angle and a means for performing the rotation, such as a stepper motor, not shown. In other words, rotating end 30 can be incrementally stepped by means of a motor about the axis of reference member 20 and its angle read by means such as an encoder. Arm 50 is rotatably mounted it may be incrementally stepped angularly with respect to the axis of reference member 20. Rotating head 47 is rotatably mounted to arm 50 whereby it may be incrementally stepped about the axis of arm 50.

The steps for determining $a_{equiv}$ are as follows:

1. Rotate arm 50 around first axis 101 until the reading of first accelerometer 45a reaches a maximum reading. When the reading starts to drop, reverse the direction of rotation. Lock this freedom of rotation. Read the rotation angle around this axis (A1). The reference zero for this angle has a known relationship to the outer enclosure for determining the outer enclosure's orientation at a later stage.

2. Rotate arm 50 around second axis 102 until the reading of first accelerometer 45a reaches a maximum. When the reading starts to drop, reverse the direction of rotation. Lock this freedom of rotation. Read the rotation angle around this axis (A2) and read $a_{equiv}$ value.

3. Rotate rotating head 47 until the reading of second accelerometer 45b reaches a value of zero. This is the direction normal to the plane that contains $a_{rot}$ and $a_{rev}$. Record the direction of this normal (A3).

4. The combination of A1, A2 and the reading of first accelerometer 45a determine the vector $a_{equiv}$ at this position. A3 adds the direction of the plane created by $a_{rot}$ and $a_{rev}$.

In order to have an accurate result, all readings are preferably taken at the same time. Multiple iterations may be performed for each measurement with smaller and smaller inspection ranges until the readings are close enough in time or until a good enough mathematical approximation can be made and fine-tuned by additional measurements and curve smoothening.

The A3 measurement is only needed for the direct computation method. For the indirect computation method, the $a_{equiv}$ measurement is sufficient.

In an alternative embodiment of the method, it is possible to determine $dir_{cg}$ from $dir_{cg}^*$ and $a_{equiv}$. To correct the angle shift between $dir_{cg}^*$ and $dir_{cg}$ that results from $a_{equiv}$, a vector equation must be solved for the forces acting on the mass.

The two force vectors $f1 = m^*g$ (on Earth) or $f1 = m^*$gravitational acceleration (on another planet) and $f2 = m^* a_{equiv}$ as measured by the positioning device. The direction of the equivalent vector of these two vectors is known ($dir_{cg}^*$). The required result is the direction of f1. This direction can be found by solving the vector equation.

Once this compensation angle is calculated, the mass's direction ($dir_{cg}^*$) is rotated to this new direction in order to have all future measurements relative to $dir_{cg}$.

An iterative process is performed where this equation is solved for every measurement of $a_{equiv}$ and $dir_{cg}^*$ is rotated until the angle received from the calculation equals zero or a pre-determined small value. This is a method for fine-tuning $dir_{cg}$ over time.

For correcting $dir_{cg}$ errors created by local mass concentrations, the known local (in the area determined in the first position determination iteration) information is entered into the computation algorithm. This includes mountains, surveyed mass concentrations and tides.

At the end of this process, the reference angles $A_{cg}1$ and $A_{cg}2$ between $dir_{cg}$ and the outer enclosure receive final values that are used for determining the orientation of the outer enclosure.

During the time of taking a measurement, the apparatus needs to be stationary and stable with minimal vibration. For position determination in places not completely stable, the measurement assembly is mounted in a housing comprising an inner enclosure attached to an outer enclosure with shock absorbers, not shown. The inner enclosure is comprised of three accelerometers in three orthogonal axes. The momentary product vector from the readings of these reference accelerometers is subtracted from the momentary reading of the main accelerometer to result in $a_{equiv}$.

Although negligible, the effect of the height from sea level on the rotational radius can be eliminated or compensated by including an altimeter inside the positioning device and using its reading for $a_{rot}$ adjustment. Compensation due to the known aspherical shape of the planet can be added after the first position determination and additional iterations can be made for improved accuracy.

In locations close to the equator or when the device for which the position is investigated is randomly deployed in a conditions where the hemisphere is unknown, the determined latitude does not indicate the hemisphere in which it is located. The determination of the hemisphere is described after the two computation methods below are explained.

In performing the direct computation method, the process described above for correcting $dir_{cg}^*$ to $dir_{cg}$ is performed as the first step using a few measurements before starting the positioning calculations. After this step, all the measurements relate to the corrected $dir_{cg}$.

After completing the above correction step, the remaining steps for determining the latitude using the direct computation method are:

1. Determine the normal to the plane that contains $a_{rot}$ and $a_{rev}$. Its direction is defined in the local coordinate system by A1, A2 and A3.

2. Determine the same direction again at a later time (more time=improved accuracy). The new direction defines a new plane that contains $a_{rot}$ and $a_{rev}$ at that time.

Since the direction of $a_{rev}$ is practically fixed in space relative to the solar system (for the short duration of the measurement process), and $a_{rot}$ (changes its direction in that system, the plane that contains these vectors rotates around the direction of $a_{rev}$.

By intersecting the two planes (or, just the same, finding the direction perpendicular to both the first and second normals), the direction of $a_{rev}$ in the local coordinate system is determined.

3. Calculate $a_{rot}$ from the now known $a_{rev}$ (direction as described above and magnitude from a lookup table) and $a_{equiv}$.

4. Calculate the latitude from the direction of $a_{rot}$ and $dir_{cg}$.

Next, the longitude is calculated under the direct computation method. The plane that includes $a_{rot}$, $a_{rev}$ and $a_{equiv}$, rotates around $a_{rev}$ by 90 degrees every quarter rotation of the planet around its axis. For a longitude pointing directly away from $a_{rev}$, this plane coincides with the plane of $a_{rot}$ and $dir_{cg}$.

1. This longitude is determined as a reference longitude to the following calculations by knowing the time that the measurement takes place relative to the time in a known location.

2. Calculate the angle between the normal to the plane of $a_{rot}$ and $a_{rev}$ at the desired location and the normal to $a_{rot}$ and $dir_{cg}$ as determined during the latitude computation.

3. Calculate that angle's theoretical change pattern for the known latitude from point 1 (longitude in the negative direction of $a_{rev}$) to point 2 (rotated 90 degrees). This change is not linear.

4. Match the measured plane angle to the theoretical calculation to determine the longitude.

5. This longitude can be in one of the four quadrants. To determine the quadrant in which the longitude is located, check the following rules: If $a_{equiv}$ is larger in magnitude than $a_{rot}$ for the known latitude, then the point is in the hemisphere pointing to the negative direction of $a_{rev}$ and vice versa. If the magnitude of $a_{equiv}$ increases in two consecutive measurements, the longitude is in the quadrant that recently moved from the positive direction of $a_{rev}$ to the negative direction of $a_{rev}$ and vice versa.

In performing the indirect computation, the process described above for correcting $dir_{cg}^*$ to $dir_{cg}$ is performed as the first step using a few measurements before starting the positioning calculations.

After this step, all the measurements relate to the corrected $dir_{cg}$.

The steps for determining the latitude under the indirect computation method are as follows:

1. Take consecutive readings of the acceleration vector sum $a_{equiv}$.

2. Record the measurements as the magnitude of this vector increases or decreases until reaching an absolute maximum or minimum. Store the measurement (magnitude and angles) with the time it was taken (real time).

3. Begin counting six hours (or a quarter of the rotation period of the planet) and take a second measurement of $a_{equiv}$. At that point, by definition, $a_{rev}$ is perpendicular to $a_{rot}$.

4. Twelve hours (or half a rotation period) later, $a_{rev}$ and $a_{rot}$ are again perpendicular to one another but $a_{rot}$ points to the opposite direction with respect to $a_{rev}$. Take a third measurement of $a_{equiv}$.

5. Add the second and third vectors to one another. The $a_{rev}$ vector is zeroed and the resulting direction is that of $a_{rot}$.

6. Calculate the latitude from the direction of $a_{rot}$ and $dir_{cg}$.

Next, the longitude is computed under the indirect computation method. By knowing the time that $a_{equiv}$ reaches absolute maximum and minimum values (step 2 above) with reference to the time in a known location, the longitude of the desired location can be determined. For this purpose, the positioning device includes a real time clock synchronized with an external clock with a known location.

The indirect method requires many consecutive measurements to be taken. These measurements are expected to have a smooth and gradual change in magnitude and direction due to the behavior of the physical system.

After taking a sufficient number of measurements, a mathematical equation can be derived and any additional measurements are then compared to its expected value. False readings (due, for example, to unsuppressed vibration) are ignored. The mathematical equation is continually refined with every new reading.

The northern or southern hemispheres may also be determined under the method of the invention. This approach is valid for planets with an inclination of their axis of rotation with respect to the plane of revolution around the sun (23.5 degrees in the case of Earth). By knowing the real time, the seasons in the hemispheres may be determined.

The investigated location is in the northern hemisphere if, during the northern summer, at a point with a longitude directly in the negative direction of $a_{rev}$, the angle between $a_{rot}$ and $dir_{cg}$ is smaller than the angle between $a_{rev}$ and $dir_{cg}$. Changing one of the parameters shall switch hemispheres.

When using this method with the direct computation method, these angles can be extrapolated using calculations as described above for the rotation of the accelerations' planes.

As mentioned before, the relationship between $dir_{cg}$ and the outer enclosure is established during the measurement process ($A_{cg}1$ and $A_{cg}2$ and A1). These three angles establish the orientation of the outer enclosure with reference to $dir_{cg}$ and the direction of $a_{rot}$.

The device and method described above can be configured to constitute an autonomous positioning device. In cases where there is a requirement for a quick, in-motion, position determination and also in cases where there is a desire to reduce the cost of a large number of positioning devices in a pre-determined area, a local positioning network can be established using such a positioning device.

This network may consist of two or more positioning devices that are deployed in an area of interest. The devices acquire their position using the methods described above. The positioning devices include transmitters capable of transmitting a signal 360 degrees.

A receiver mounted in the device for which the position is investigated picks up the signals from the positioning devices and calculates its own position based on the direction of these signals and the known position from which these signals are transmitted (triangulation). This mode of operation is the only one that requires active transmission and reception. For improved reliability of the system, a large number of positioning devices can be deployed in the area in order to increase the chance that some of them will be picked up by the receiver.

Many alterations and modifications may be made by those having ordinary skill in the art without departing from the spirit and scope of the invention. For instance, by way of example and not by limitation, any suitable means of providing an equivalent circuit function of the various circuits described herein is within the scope of the invention.

Therefore, it must be understood that the illustrated embodiment has been set forth only for the purpose of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed even when not initially claimed in such combinations.

The words used in this specification to describe the invention and its various embodiments are to be understood not only in the sense of their commonly defined meanings, but to include by special definition in this specification, structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are therefore defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can, in some cases be excised from the combination and that the claimed combination may be directed to a sub-combination or variation of a sub combination.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the fundamental idea of the invention.

While the claimed devices and methods are described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

I claim:

1. A location measurement device comprising:
    a reference member having at least two degrees of freedom and coupled to a frame, wherein the reference member includes a rotatable end;
    an arm pivotably coupled to the rotatable end and having an axis;
    a rotatable head rotatably coupled to the arm, wherein the rotatable head includes a first inertial measurement device configured to measure acceleration parallel to the axis of the arm and a second inertial measurement device configured to measure acceleration perpendicular to the axis of the arm; and
    a computation module configured to determine a position of the reference member relative to a body based on at least one measurement of the first inertial measurement device while the frame is stationary.

2. The device of claim 1, wherein one end of the reference member comprises a weighted end, and wherein the device further comprises a locking mechanism configured to lock the reference member to the frame.

3. The device of claim 1, wherein the computation module is further configured to:
    align the reference member to a gravitational vector associated with the body;
    rotate the reference member and the arm to a first position where an acceleration reading of the first inertial measurement device is maximized; and
    determine the position of the reference member relative to the body based on the acceleration reading.

4. The device of claim 1, wherein the first inertial measurement device and the second inertial measurement device comprise an accelerometer.

5. The device of claim 4, wherein the accelerometer is one of a piezoelectric, piezoresistive, or a microelectromechanical system (MEMS) accelerometer.

6. The device of claim 1, wherein the rotatable end further comprises at least one first encoder and a first motor, and wherein the rotatable head further comprises at least one second encoder and a second motor.

7. A location measurement device comprising:
    a reference member configured to align with a gravitational vector of a body; and
    a first inertial measurement device configured to align with an equivalent vector including a rotation vector and a revolution vector of the body;
    wherein an acceleration reading of the first inertial measurement device and the alignment of the first inertial measurement device are associated with a position of the reference member relative to the body.

8. The device of claim 7, further comprising a second inertial measurement device configured to align normal to a plane defined by the rotation vector and the revolution vector.

9. The device of claim 8, further comprising a computation module that is configured to:
    determine a first revolution vector based on a first measurement by the second inertial measurement device at a first time and a second measurement by the second inertial measurement device at a second time;
    determine a first rotation vector based on the first revolution vector; and
    determine a latitude of the reference member based on the first rotation vector.

10. The device of claim 9, wherein the computation module is further configured to determine a longitude of the reference member based on acceleration characteristics of a reference longitude.

11. The device of claim 10, wherein the computation module is further configured to determine a hemisphere of the latitude by comparing the first rotation vector and the first revolution vector to the gravitational vector when a longitude vector of the device relative to the body is pointed opposite of the direction of the first revolution vector.

12. The device of claim 7, further comprising a computation module configured to:
    measure the equivalent vector for at least three-quarters of a rotation of the body;
    determine a first midway equivalent vector and a second midway equivalent vector, wherein the first midway equivalent vector occurs halfway between a maximum equivalent vector and a minimum equivalent vector during the rotation, and wherein the second midway equivalent vector occurs halfway between the minimum equivalent vector and the maximum equivalent vector during the rotation;
    determine the revolution vector based on the first midway equivalent vector and the second midway equivalent vector;
    determine a first rotation vector based on the revolution vector; and
    determine a latitude of the device based on the first rotation vector.

13. The device of claim 12, further comprising an altimeter, wherein the determination of the latitude is based, at least in part, on a reading of the altimeter.

14. A location measurement device comprising:
    a reference member;
    an arm pivotably mounted to the reference member; and
    an accelerometer coupled to the arm; and
    a computation module configured to:
        align the reference member to a gravitational vector associated with a body;
        at a first time, pivot the arm to a first position where a first acceleration reading of the accelerometer is maximized;
        at a second time, pivot the arm to a second position where a second acceleration reading of the accelerometer is maximized; and
        determine a position of the reference member relative to the body based on the first acceleration reading and second acceleration reading.

15. The device of claim 14, wherein the reference member is configured to be adjusted by a compensation angle that corrects for rotational and revolution effects of the body.

16. The device of claim 14, further comprising a vibration compensator associated with the reference member.

17. The device of claim 14, wherein the computation module comprises a look-up table including acceleration characteristics associated with latitudes and longitudes of the body.

18. A method of locating a device, the method comprising:
determining, at a first time, a first normal vector normal to a rotation vector and a revolution vector of a body;
determining, at a second time, a second normal vector normal to the rotation vector and the revolution vector of the body;
determining the revolution vector based on the first normal vector and the second normal vector;
determining a first rotation vector based on the revolution vector; and
determining a latitude of the device based on the first rotation vector.

19. The method of claim 18, further comprising:
determining a first angle between the second normal vector and a vector normal to the rotation vector and a gravitational vector;
comparing the first angle to a model of longitudinal angles associated with a known location; and
determining a longitude of the device based on the comparison.

20. The method of claim 18, wherein said determining a first normal vector and said determining a second normal vector each comprise aligning a first inertial measurement device with an equivalent vector including the rotation vector and the revolution vector and aligning a second inertial measurement device normal to a plane defined by the rotation vector and the revolution vector.

21. A method of locating a device, the method comprising:
measuring an equivalent vector including a rotation vector and a revolution vector for at least three-quarters of a rotation of a body;
determining a first midway equivalent vector and a second midway equivalent vector, wherein the first midway equivalent vector occurs halfway between a maximum equivalent vector and a minimum equivalent vector during the rotation, and wherein the second midway equivalent vector occurs halfway between the minimum equivalent vector and the maximum equivalent vector during the rotation;
determining the revolution vector based on the first midway equivalent vector and the second midway equivalent vector;
determining a first rotation vector based on the revolution vector; and
determining a latitude of the device based on the first rotation vector.

22. The method of claim 21, wherein said measuring an equivalent vector comprises aligning a first inertial measurement device with the equivalent vector.

23. The method of claim 21, further comprising:
comparing a time of occurrence of at least one of the maximum equivalent vector or the minimum equivalent vector with a known reference; and
determining a longitude of the device based on the comparison.

24. The method of claim 23, wherein the time of occurrence is determined using a clock synchronized with a clock associated with the known reference.

25. The method of claim 21, further comprising determining a hemisphere of the latitude by comparing the first rotation vector and the revolution vector to the gravitational vector when a longitude vector of the device relative to the body is pointed in the direction opposite of the direction of the first revolution vector.

* * * * *